Aug. 6, 1940.      H. FRIEDMAN      2,210,074
CLUTCH PLATE
Filed Oct. 7, 1938      2 Sheets-Sheet 1

INVENTOR.
HARRY FRIEDMAN
BY Jay, Oberlin & Jay
ATTORNEYS.

Aug. 6, 1940.         H. FRIEDMAN         2,210,074
CLUTCH PLATE
Filed Oct. 7, 1938         2 Sheets-Sheet 2

INVENTOR.
HARRY FRIEDMAN
BY Fay, Oberlin & Fay
ATTORNEYS.

Patented Aug. 6, 1940

2,210,074

UNITED STATES PATENT OFFICE 2,210,074

CLUTCH PLATE

Harry Friedman, Cleveland, Ohio, assignor to Automotive Devices Company, Cleveland, Ohio, a corporation of Ohio Application October 7, 1938, Serial No. 233,871

7 Claims. (Cl. 192—68)

The present invention relates to that particular type of clutch plates wherein there is yieldable movement between the hub and the friction engagement portion or disc. Such clutch plates are commonly referred to as being of the "cushion center" type.

The general object and nature of my invention is to provide such a clutch plate which is of relatively simple, economical and yet strong and durable construction. My invention provides a cover plate for the hub flange and coil springs which serves the multiple functions of retaining the parts in assembled relation, enclosing or housing the coil springs, providing end abutments for the latter, providing limit stop projections or lugs for the hub flange; and finally, providing clearance areas for fastening rivets.

To the accomplishment of the foregoing and related ends, said invention, then, consists of the means hereinafter fully described and particularly pointed out in the claims.

The annexed drawings and the following description set forth in detail certain structures embodying the invention, such disclosed means constituting, however, but one of various structural forms in which the principle of the invention may be used.

Figure 1:
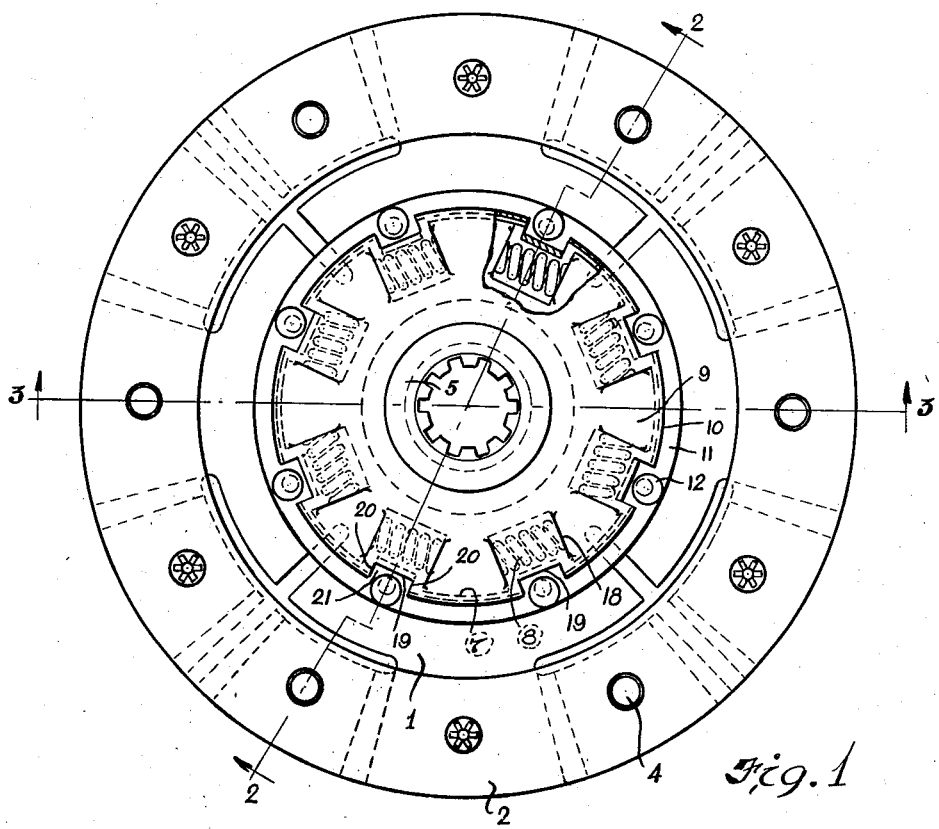
Figure 2:
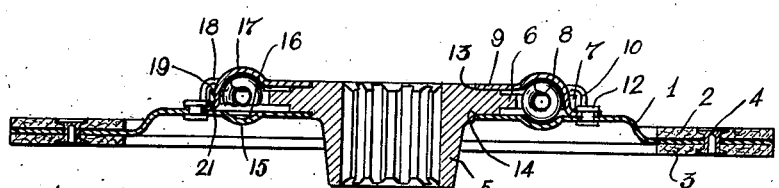
Figure 3:
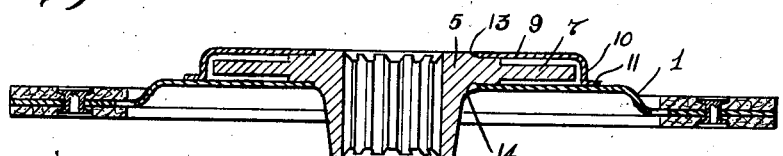
Figure 4:
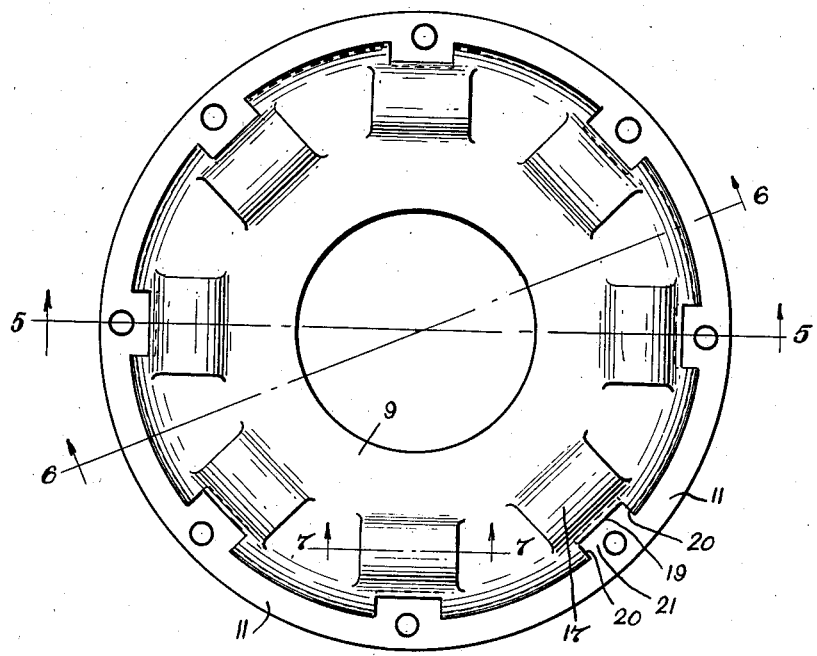
Figure 5:
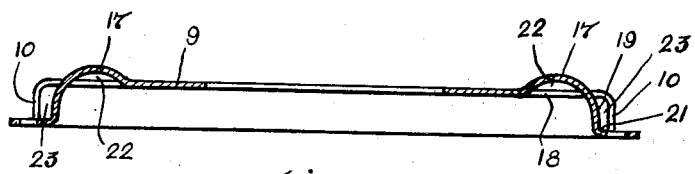
Figure 6:
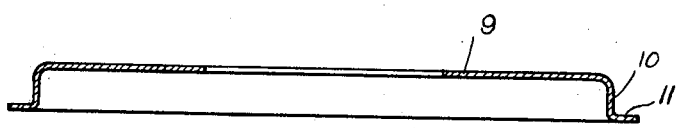
Figure 7:
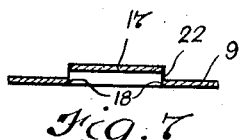

In said annexed drawings:

Fig. 1 is a plan view of a clutch plate embodying the principle of my invention; Fig. 2 is a transverse section of Fig. 1 taken substantially along line 2—2 thereof; Fig. 3 is another transverse section of Fig. 1 and taken substantially along line 3—3 thereof; Fig. 4 is a plan view taken upon the outside face of the cover plate alone; Fig. 5 is a transverse sectional view of Fig. 4 taken substantially along line 5—5 thereof; Fig. 6 is another transverse section of Fig. 4 and taken substantially along line 6—6 thereof; and Fig. 7 is a detailed sectional view taken substantially along line 7—7 of Fig. 4.

Now referring more particularly to the drawings, the clutch plate shown therein includes the disc 1 upon whose outermost marginal portions the friction facing rings 2 and 3 are attached in customary manner by means of the rivets 4. The splined hub 5 is rotatably and centrally located with respect to the disc 1. The hub 5 has a radially extending flange 6 whose outermost portion is in the form of a series of radially extending spokes 7. Compression coil springs 8 are mounted between the spokes 7, with the ends of the springs bearing against the sides of the spokes.

A stamped metal cover plate 9 which is of substantially a dish shaped cross-sectional contour, has the axially extending wall portion 10 terminating in the marginal, radially extending flange 11 which contacts with the face of the clutch disc 1. Rivets 12, or like fastening elements, attach the cover plate 9 to the disc 1.

The inner margin of the cover plate 9 contacts the hub 5 at the shoulder 13; and in the same manner the inner margin of the disc 1 contacts the hub 5 at the shoulder 14. Referring to Figs. 2 and 3, it will be seen that the shoulders 13 and 14 are formed by the enlarged portion or base of the flange 6 and the outside wall of the hub 5. It will be noted that the remaining outer portion of the flange 6, including the spokes 7 is spaced from the disc 1 and cover plate 9. There are thus provided bearing surfaces between the movable parts of the clutch plate, viz., the hub 5, the disc 1 and the cover plate 9 which not only serve the purpose of properly aligning the parts, but also are located at the furthest removed point from the outer marginal portions of the disc 1 where the maximum heat of friction is generated, viz., at the friction facings 2 and 3. Thus, those portions of the clutch plate parts which are subjected to wear and friction due to moving contact with each other, are located at points furthest removed from those other points of the clutch plate subjected to maximum heat generation due to frictional contact with exterior elements such as the pressure plate and flywheel of a clutch assembly. The body of the disc 1 is deformed at intervals in registry with or corresponding to the location of the coil springs 8, to form the outward bulges 15 and the spring end abutments 16. The bulges 15 function as enclosing and protective housings extending from end to end of the coil springs 8.

The cover plate 9 has its radially extending wall portions deformed at intervals into the outwardly bulging portions 17 which serve as means for completely enclosing or housing the sides of the coil springs 8. At the radial line where the wall portions 17 depart from the wall of the cover plate 9, there are formed the abutments 18 for the ends of the coil springs 8. The axially extending wall portion 10 of the cover plate 9 is also deformed at intervals by means of the indentations 19 contiguous to the bulges 17. Along the radial lines where the indentations 19 part from the axial wall 10 there are formed the abutments 20 normally spaced from the sides of the spokes 7. The abutments 20 thus extend between the spokes in normally spaced relationship, and upon engagement with the latter, limit their movement and serve as limit stops for the relative movement between the disc 1 and hub 5. In Fig. 1, a portion of the plate 9 is shown broken away, more clearly revealing the relationship of the spokes 7 and abutments 20. The indentations 19 also provide the enlarged areas 21 integral with and forming a part of the cover plate marginal flange 11, so that ample space is provided for the fastening rivets 12, thereby eliminating the necessity of providing a larger number of rivets of smaller sizes, or of enlarging the width of the flange 11.

The deformed wall portions, or bulges 17 and indentations 19, being separated and offset from the body of the cover plate 9 also provide ventilating openings or louvers 22 and 23 which permit the circulation of cooling air to the coil springs 8 whereby the temperature of operation of the latter is reduced and the life and efficiency of the springs maintained.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In a clutch plate comprising a friction disc and a flanged hub movably mounted centrally thereof, the combination of a cover plate contacting the flange of said hub at its inner periphery and contacting said disc at its outer periphery, means for fastening said cover plate to said disc, said flange having a series of spokes around its outer periphery, coil springs mounted between said spokes, radially disposed abutments on said disc and on said cover plate respectively, contacting the ends of said springs, and projections formed by indentations on said cover plate extending radially inward between said spokes.

2. In a clutch plate comprising a friction disc and a flanged hub movably mounted centrally thereof, the combination of a cover plate contacting the flange of said hub at its inner periphery and contacting said disc at its outer periphery, means for fastening said cover plate to said disc, said flange having a series of spokes around its outer periphery, coil springs mounted between said spokes, radially disposed abutments on said disc and on said cover plate respectively, contacting the ends of said springs, the walls of said disc and of said cover plate having oppositely and outwardly disposed depressions enclosing the sides of said springs, said depressions being in the form of radially uninterrupted continuations of said walls and projections formed by indentations on said cover plate extending radially inward between said spokes.

3. In a clutch plate comprising a friction disc and a flanged hub movably mounted centrally thereof, the combination of a cover plate contacting the flange of said hub at its inner periphery and contacting said disc at its outer periphery, means for fastening said cover plate to said disc, said flange having a series of spokes around its outer periphery, coil springs mounted between said spokes, radially disposed abutments on said disc and on said cover plate respectively, contacting the ends of said springs, the walls of said disc and of said cover plate having oppositely and outwardly disposed depressions enclosing the sides of said springs, said depressions being in the form of radially uninterrupted continuations of said walls, said abutments and said depressions forming radially disposed openings in the common radial plane of said ends of said depressions and of said abutments, and projections formed by indentations on said cover plate extending radially inward between said spokes.

4. In a clutch plate comprising a friction disc and a flanged hub movably mounted centrally thereof, the combination of a cover plate contacting the flange of said hub at its inner periphery and contacting said disc at its outer periphery, means for fastening said cover plate to said disc, said flange having a series of spokes around its outer periphery, coil springs mounted between said spokes, radially disposed abutments on said disc and on said cover plate respectively, contacting the ends of said springs, projections on said cover plate extending radially inward between said spokes, said projections being formed by indentations in the outer wall of said cover plate, and said fastening means being located adjacent said indentations.

5. In a clutch plate comprising a friction disc and a flanged hub movably mounted centrally thereof, the combination of a cover plate contacting the flange of said hub at its inner periphery and contacting said disc at its outer periphery, means for fastening said cover plate to said disc, said flange having a series of spokes around its outer periphery, coil springs mounted between said spokes, radially disposed abutments on said disc and on said cover plate respectively, contacting the ends of said springs, the walls of said disc and of said cover plate having oppositely and outwardly disposed depressions enclosing the sides of said springs, projections on said cover plate extending radially inward between said spokes, said projections being formed by indentations in the outer wall of said cover plate, and said fastening means being located adjacent said indentations.

6. In a clutch plate comprising a friction disc and a flanged hub movably mounted centrally thereof, the combination of a cover plate contacting the flange of said hub at its inner periphery and contacting said disc at its outer periphery, means for fastening said cover plate to said disc, said flange having a series of spokes around its outer periphery, coil springs mounted between said spokes, radially disposed abutments on said disc and on said cover plate respectively, contacting the ends of said springs, the walls of said disc and of said cover plate having oppositely and outwardly disposed depressions enclosing the sides of said springs, said abutments and said depressions forming radially disposed openings in the common radial plane of said ends of said depressions and of said abutments, projections on said cover plate extending radially inward between said spokes, said projections being formed by indentations in the outer wall of said cover plate, and said fastening means being located adjacent said indentations.

7. In a clutch plate comprising a friction disc and a flanged hub movably mounted centrally thereof, the combination of a dish-shaped cover plate having radially and axially disposed wall portions and an outer marginal flange on said axially disposed wall portion contacting said disc, said radially disposed wall portion overlying the flange of said hub co-extensive with said disc, said hub flange having a series of spokes around its outer periphery, coil springs mounted between said spokes, and deformed portions on said cover plate at the juncture of said radially and axially disposed wall portions so arranged and formed as to constitute enclosing housings and to produce in said wall portions end abutments for said springs and limit stop abutments for said spokes.

HARRY FRIEDMAN.